US011989832B2

(12) United States Patent
Helmore et al.

(10) Patent No.: US 11,989,832 B2
(45) Date of Patent: May 21, 2024

(54) METHOD FOR CONSTRUCTING A 3D REPRESENTATION OF A CONDUIT INTERNAL SURFACE

(71) Applicant: E.V. OFFSHORE LIMITED, Norwich (GB)

(72) Inventors: Steven Helmore, Aberdeenshire (GB); Christopher Scott, Norwich (GB); Philip Brown, Norwich (GB); Jonathan Thursby, Norwich (GB)

(73) Assignee: E.V. OFFSHORE LIMITED, Norwich (GB)

( * ) Notice: Subject to any disclaimer, the term of this patent is extended or adjusted under 35 U.S.C. 154(b) by 925 days.

(21) Appl. No.: 16/971,973

(22) PCT Filed: Feb. 4, 2019

(86) PCT No.: PCT/GB2019/050291
§ 371 (c)(1),
(2) Date: Aug. 21, 2020

(87) PCT Pub. No.: WO2019/162643
PCT Pub. Date: Aug. 29, 2019

(65) Prior Publication Data
US 2020/0394839 A1    Dec. 17, 2020

(30) Foreign Application Priority Data

Feb. 21, 2018  (GB) ........................................ 1802810
Feb. 21, 2018  (GB) ........................................ 1802812

(51) Int. Cl.
*G06T 17/20*    (2006.01)
*G01B 11/255*   (2006.01)
(Continued)

(52) U.S. Cl.
CPC ............ *G06T 17/20* (2013.01); *G01B 11/255* (2013.01); *G01N 21/954* (2013.01); *G06T 5/80* (2024.01);
(Continued)

(58) Field of Classification Search
CPC ......... G06T 17/20; G06T 5/006; G06T 17/10; G06T 2200/08; G06T 7/50;
(Continued)

(56) References Cited

U.S. PATENT DOCUMENTS

2011/0304628 A1  12/2011  Fu et al.
2015/0154795 A1   6/2015  Ogale et al.
2016/0261829 A1*  9/2016  Olsson ................... G03B 37/04

FOREIGN PATENT DOCUMENTS

KR        101664365 B1    10/2016

OTHER PUBLICATIONS

Bodenmann et al. "Visual Mapping of Internal Pipe Walls using Sparse Features for Application on board Autonomous Underwater Vehicles." Oceans 2009—Europe, May 11, 2009, 8 pages (Year: 2009).*

(Continued)

*Primary Examiner* — Jon Chang
(74) *Attorney, Agent, or Firm* — Hayes Soloway PC

(57) ABSTRACT

A method for constructing a three-dimensional representation of an internal surface of a conduit comprises obtaining a plurality of images of the internal surface of the conduit, for example from a camera mounted on an inspection tool, constructing, from the plurality of images, a composite image of the internal surface, providing a shape model of the internal surface, constructing, using the shape model, a three-dimensional mesh of the internal surface, and constructing a three-dimensional representation of the internal surface by assigning a pixel value from the composite image (Continued)

to a corresponding node of the mesh. The three-dimensional representation may be derived from two or more sets of images obtained under different image acquisition conditions, such as different camera angles, lighting conditions or spectral sensitivities.

12 Claims, 8 Drawing Sheets

(51) Int. Cl.
*G01N 21/954* (2006.01)
*G06T 5/80* (2024.01)
*G06T 17/10* (2006.01)

(52) U.S. Cl.
CPC .......... *G06T 17/10* (2013.01); *G01B 2210/52* (2013.01); *G06T 2200/08* (2013.01)

(58) Field of Classification Search
CPC ........... G06T 2207/30108; G06T 17/00; G06T 15/04; G06T 5/80; G01B 11/255; G01B 2210/52; G01B 11/24; G01N 21/954; G01N 2021/8887
See application file for complete search history.

(56) References Cited

OTHER PUBLICATIONS

Hansen et al. "Stereo Visual Odometry for Pipe Mapping." IEEE/RSJ International Conference on Intelligent Robots and Systems, Sep. 25, 2011, pp. 4020-4025 (Year: 2011).*
English translation of Korean Patent Document 10-1664365 B1 (Year: 2016).*

* cited by examiner

METHOD FOR CONSTRUCTING A 3D REPRESENTATION OF A CONDUIT INTERNAL SURFACE

CROSS-REFERENCE TO RELATED APPLICATIONS AND PRIORITY

This patent application claims priority from PCT Patent Application No. PCT/GB2019/050291 filed Feb. 4, 2019, which claims priority from Great Britain Patent Application No. GB 1802810.0 filed Feb. 21, 2018 and Great Britain Patent Application No. GB 1802812.6 filed Feb. 21, 2018. Each of these patent applications are herein incorporated by reference in their entirety.

FIELD OF THE INVENTION

This invention relates to a method for creating a three-dimensional (3D) representation of a surface of a pipe or conduit. This invention relates in particular to the creation of a 3D representation of an internal surface of a wellbore conduit or downhole casing.

BACKGROUND TO THE INVENTION

In the oil and gas industries, imaging of the internal surface of a conduit, such as a wellbore conduit, pipe or downhole casing, can provide useful information on the condition and performance of the conduit and can assist in the performance of various operations within the conduit.

Imaging is typically performed by passing an inspection tool equipped with one or more cameras along the conduit. As the tool transits through the conduit, video images of the internal surface of the conduit are obtained by the or each camera. The video images may be stored in the tool for later retrieval or transmitted to the surface for viewing in real-time.

The video images provide a two-dimensional view of the internal surface of the conduit, which can be difficult to interpret. In particular, three-dimensional features on the surface of the conduit, and changes in the shape of the conduit itself, may not be clearly distinguishable. These problems can be exacerbated by distortions in the video images due to imaging geometry, particularly when the inspection tool includes a downview camera.

Against that background, it would be desirable to provide a method that allows improved visualisation of the internal surface of a conduit.

SUMMARY OF THE INVENTION

Embodiments of the present invention combine measured or modelled pipe dimensions with multiple images of the surface of the pipe captured by a camera on a downhole inspection tool. The combined data may be used to produce a representation comprising a textured 3D surface that can be viewed, for example, in a virtual reality space to allow more detailed interpretation of the captured data than presently achievable using two-dimensional images.

Embodiments of this invention may be applicable to the real-time or post-processing of downhole video camera images from surface or subsurface conduits in the oil and gas industry.

The 3D surface and corresponding data may be used for precision correlation of objects that are non-magnetic or asymmetric, have a complex geometry or are small in size. It may be used for time lapse monitoring of corrosion or erosion, for the monitoring of deposits or obstructions, and for the observation and examination of milling or clean-up operations. The method may be used to assist in processes for cutting or punching or perforating downhole hardware, in processes for the placement of abrasive or chemical cleaning agents, in processes for the removal of foreign objects, and for the monitoring of production or leaks. Additionally, it is envisaged that it may also be used for blowout preventer (BOP) inspection, subsurface safety valve (SSSV) inspection, sliding sleeve or inflow control device (ICD) inspection, lock profile inspection, plug/packer/valve removal, or sand control inspection.

In one aspect, the invention resides in a method for constructing a three-dimensional representation of an internal surface of a conduit, comprising:
obtaining a plurality of images of the internal surface of the conduit;
constructing, from the plurality of images, a composite image of the internal surface;
providing a shape model of the internal surface;
constructing, using the shape model, a three-dimensional mesh of the internal surface; and
constructing a three-dimensional representation of the internal surface by assigning a pixel value from the composite image to a corresponding node of the mesh.

The method may further comprise aligning the position and orientation of the composite image and the shape model.

The mesh may be constructed such that a node density of the mesh equals a pixel resolution of the composite image.

Providing the shape model of the internal surface may comprise obtaining a plurality of radius measurements of the internal surface of the conduit. The radius measurements may for example be obtained using a multi-fingered caliper device. Preferably, the plurality of radius measurements are obtained when obtaining the plurality of images. For example, the radius measurements may be obtained from a device mounted on the same tool as the imaging device used to obtain the images.

Providing the shape model of the internal surface may instead comprise constructing a shape model from assumed or known dimensions of the conduit.

The method may comprise correcting the plurality of images for lens and/or geometrical distortions.

The method may comprise obtaining at least two sets of images of a common area of the internal surface and constructing, from each set of images, a respective composite image of the common area. Constructing the three-dimensional representation of the internal surface preferably comprises assigning a pixel value from each composite image to a corresponding node of the mesh. In this way, the information from different composite images, derived from the different image sets, is included in the three-dimensional representation.

The method may comprise selecting, for each node, a pixel value from one of the composite images for display in the three-dimensional representation. For example, the method may comprise selecting the pixel value from one of the composite images automatically according to a viewing condition of the three-dimensional representation. Alternatively, the selection may be made by a user.

Each set of images is preferably obtained under different image acquisition conditions. For example, each set of images may be obtained using different camera angles. In another example, each set of images is obtained using different lighting conditions. In a further example, each set of images is obtained using different spectral sensitivities. In these ways, the three-dimensional representation can provide useful additional information for use in identifying features and conditions of the internal surface of the conduit.

The method of the invention is suitable for use with any conduit, including pipes, cased and uncased holes, wellbores and so on. The conduit may be a surface or subsurface conduit, and may be at any orientation.

Further aspects of the present invention provide conduit inspection systems comprising an inspection tool and a computer system arranged to perform one or more of the methods of the above-described aspects of the invention.

Preferred and/or optional features of each aspect and embodiment of the invention may be used, alone or in appropriate combination, in the other aspects and embodiments also.

BRIEF DESCRIPTION OF THE DRAWINGS

Embodiments of the invention will now be described, by way of example only, with reference to the accompanying drawings in which like reference numerals are used for like features, and in which.

DESCRIPTION OF THE PREFERRED EMBODIMENTS

Figure 1A:
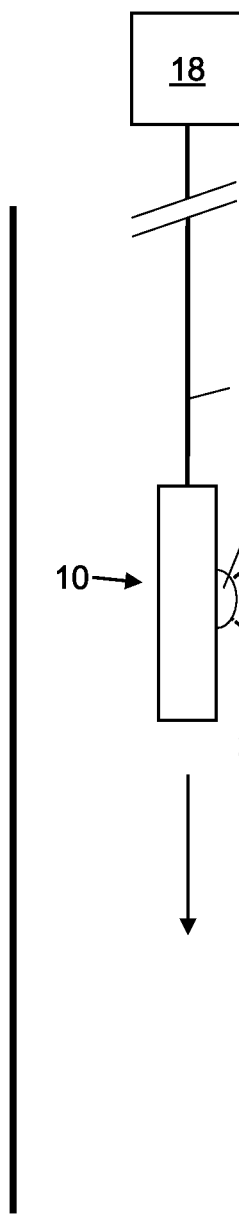
FIGS. 1a, 1b and 1c illustrate an inspection tool having a sideview camera capturing successive overlapping images of the internal surface of a pipe as the inspection tool is moved along the pipe.

FIG. 1a shows, schematically and in cross-section, an inspection tool 10 having an imaging device in the form of a sideways-facing visible light camera 12. The camera 12 captures images through a lens disposed in a side wall of the inspection tool 10. A centreline of the field of view of the camera 12, is substantially perpendicular to a longitudinal axis of the inspection tool 10. Such cameras are generally referred to as sideview cameras in the art of wellbore inspection tools.

The tool 10 is shown in operation in a pipe or conduit 14 of a well or other downhole structure. The tool 10 is suspended on a connecting line or downhole line which in this case comprises a cable 16. The cable 16 is attached to a surface control module 18, which is shown schematically in FIG. 1a only.

The control module 18 includes a winch for pulling in and paying out the cable 16, allowing the tool 10 to be moved axially along the pipe 14. By "axially", it is meant that the tool 10 transits in a direction generally parallel to the longitudinal axis of the pipe. As is generally known in the art, operation of the winch is monitored and logged by the control module 18 so that the depth of the tool 10 as a function of time can be estimated from a displacement measurement of the cable 16. For example, the length of cable 16 payed out or pulled in may be measured directly or determined from the operating speed and direction of the winch, with the estimated depth of the tool 10 being equal to the length of cable 16 deployed at a given time.

The camera 12 of the tool 10 is arranged to capture successive images of the internal surface of the pipe 14 that lie within a field of view 20 of the camera 12. Conveniently, the successive images can be captured in the form of a video stream, in which successive images or frames are captured at intervals determined by the frame rate of the video stream.

Figure 1B:
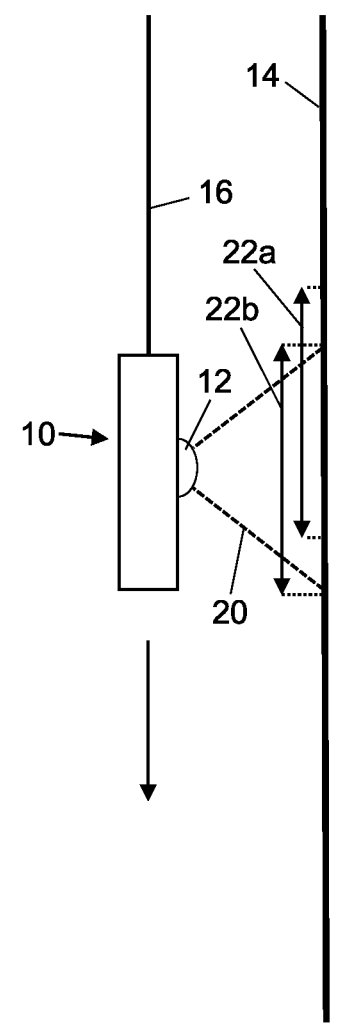
Figure 1C:
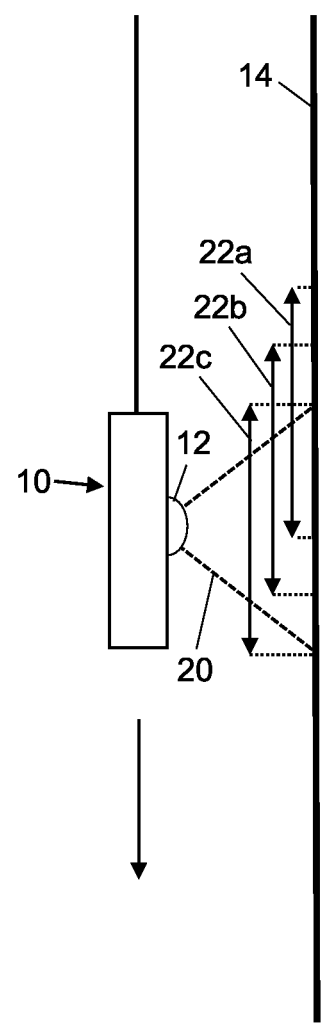

In FIG. 1a, the axial extent of a first image 22a is indicated. It will be appreciated that the circumferential extent of the image is not indicated in the cross-sectional view of FIG. 1a. FIGS. 1b and 1c show the position of the tool 10 with respect to the pipe 14 at subsequent points in time as the tool 10 moves downwardly along the pipe 14.

As illustrated in FIG. 1b, as the tool 10 moves along the pipe 14, the field of view 20 of the camera 12 shifts axially. The camera 12 then captures a second image 22b, corresponding to the subsequent frame in the video stream. The second image 22b overlaps axially with the first image. FIG. 1c shows the position of the tool 10 when a third image 22c is captured, corresponding to a further subsequent frame in the video stream. The third image 22c overlaps axially with the second image 22b. Further axially-overlapping images are captured as the tool 10 continues to move along the pipe 14. The elapsed time or transit time at which each image is obtained is recorded.

Figure 2:
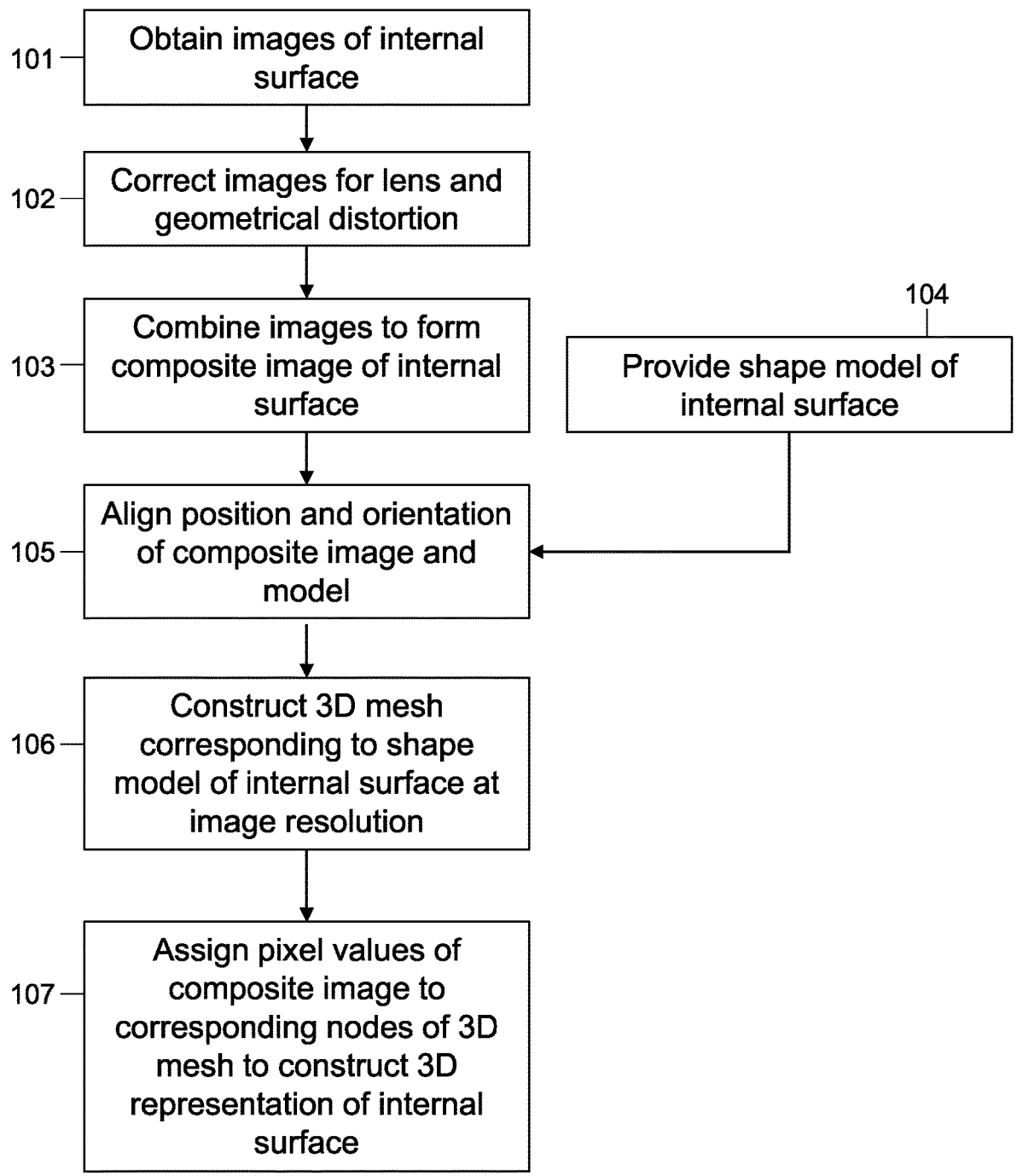
FIG. 2 is a flowchart showing steps in a first method for constructing a three-dimensional representation of the internal surface of the pipe from the images captured by the tool of FIG. 1.

FIG. 2 shows steps in a method according to an embodiment of the invention.

In step 101, a plurality of images of the internal surface of the pipe are obtained from the inspection tool 10 of FIG. 1.

In step 102, the images obtained in step 101 are corrected to account for geometrical distortions caused by viewing geometry and other distortions and effects, and to apply a lens correction to account for individual lens properties. These corrections ensure that each of the pixels of the images can be associated correctly with a spatial position on the internal surface of the pipe.

In step 103, the corrected images are combined to form a composite image of the internal surface using suitable image stitching techniques. The composite image extends over a region of interest of the internal surface of the pipe.

In step 104, a shape model of the inside surface of the pipe is provided. The model comprises a geometrical description of the shape of the inside surface of the pipe, for example as a set of radius values at corresponding depth and azimuth coordinates. As will be described in more detail below, the model may for example be derived from measurement data obtained from a caliper survey of the pipe or other measurement techniques, from dimension data obtained from engineering drawings of the pipe, and/or from an assumed or estimated pipe shape.

In step 105, the position and orientation of the composite image and the position and orientation of the shape model are aligned. This allows the image data to be matched to the correct spatial position in the shape model.

In step 106, a three-dimensional mesh of the internal surface is constructed. The mesh corresponds to the shape model provided in step 104, with suitable interpolation so that the density of nodes in the mesh matches the resolution of the composite image.

In step 107, each node in the mesh is assigned a pixel value from the corresponding spatial position in the composite image to construct a three-dimensional representation of the inside surface of the pipe. As is known in the art, the "pixel value" of a given pixel may be a single value (such as an intensity value in a grayscale image), a set of values (such as RGB values in a colour image), a colour map index value or any other suitable value or set of values.

The three-dimensional representation constructed in step 107 can be viewed with standard packages and techniques for viewing 3D objects (such as CAD packages or virtual reality technology). By projecting the image data onto a suitable shape model of the pipe, the three-dimensional representation obtained can be more readily interpreted by a user compared to inspection of the composite image alone.

Figures 3, 4:
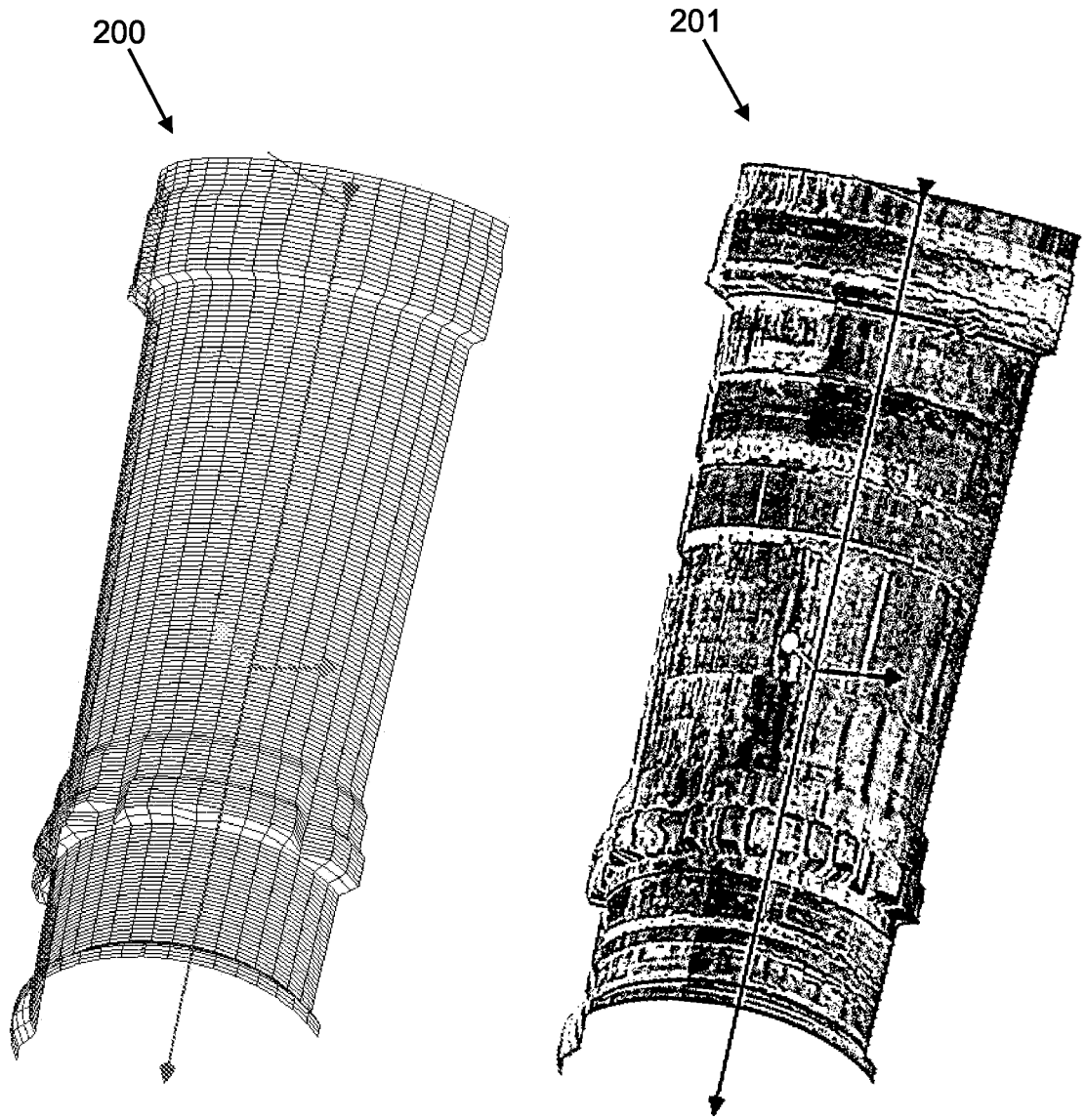
FIG. 3 shows a model of the internal surface of the pipe for use in the method of FIG. 2.
FIG. 4 shows an example of a 3D representation of the internal surface of the pipe as obtained by the method of FIG. 2.

FIG. 3 shows an example of part of a shape model 200 as provided in step 104 of FIG. 2. In this case, the shape model 200 is determined from a multi-finger caliper tool survey of the pipe. The shape model 200 comprises azimuth and depth coordinates corresponding to a series of caliper traces.

The resolution of the caliper data in the shape model 200 is substantially lower than the resolution of the composite image obtained in step 103. In step 106, the 3D mesh can be constructed by interpolating the data from the shape model 200, using suitable interpolation techniques, so that the node density in the resulting mesh corresponds to the image resolution.

Figure 5:
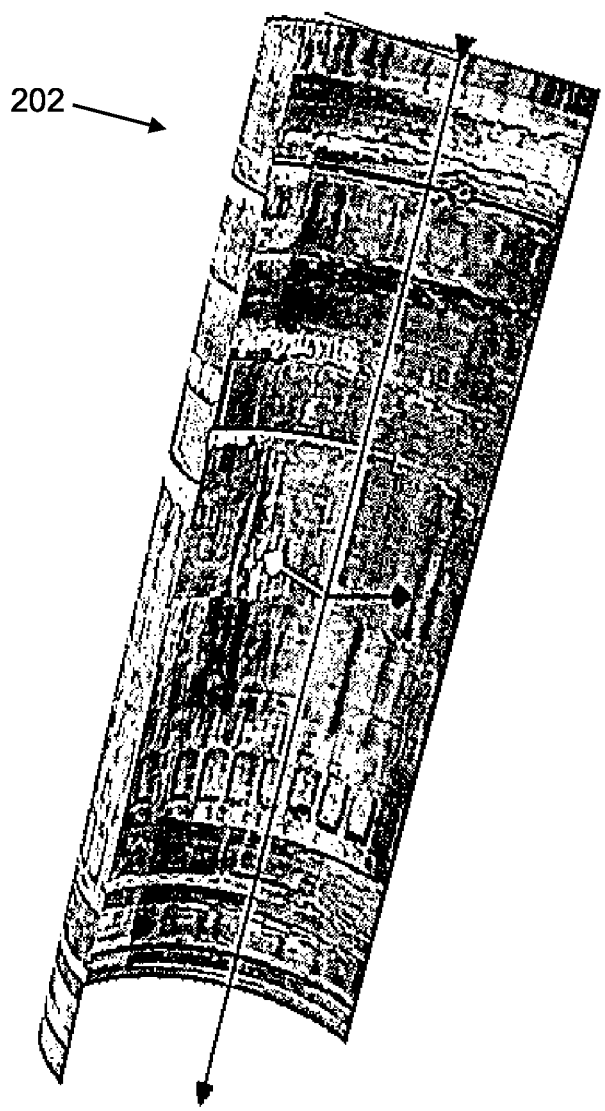
FIG. 5 shows a further example of a 3D representation of the internal surface of the pipe as obtained by the method of FIG. 2.

FIG. 4 is a view of a three-dimensional representation 201 created by applying composite image data to a 3D mesh constructed by interpolation of the shape model 200 of FIG. 3. Although FIG. 4 is illustrated in black-and-white, it will be appreciated that the representation can include any colour information in the image data.

Where caliper data or other measurements of the pipe surface are not available, the shape model provided in step 104 of the method of FIG. 2 may be based on an assumed shape of the pipe, such as a simple tube. By way of example, FIG. 5 is a view of a three-dimensional representation 202 created by applying the same composite image data as used in FIG. 4 to a 3D mesh comprising a cylindrical surface.

In the above examples, the three-dimensional representation incorporates a single set of image data, based on a single composite image. Said another way, each node in the 3D mesh is allocated the RGB values of a single pixel of the composite image.

Figure 6:
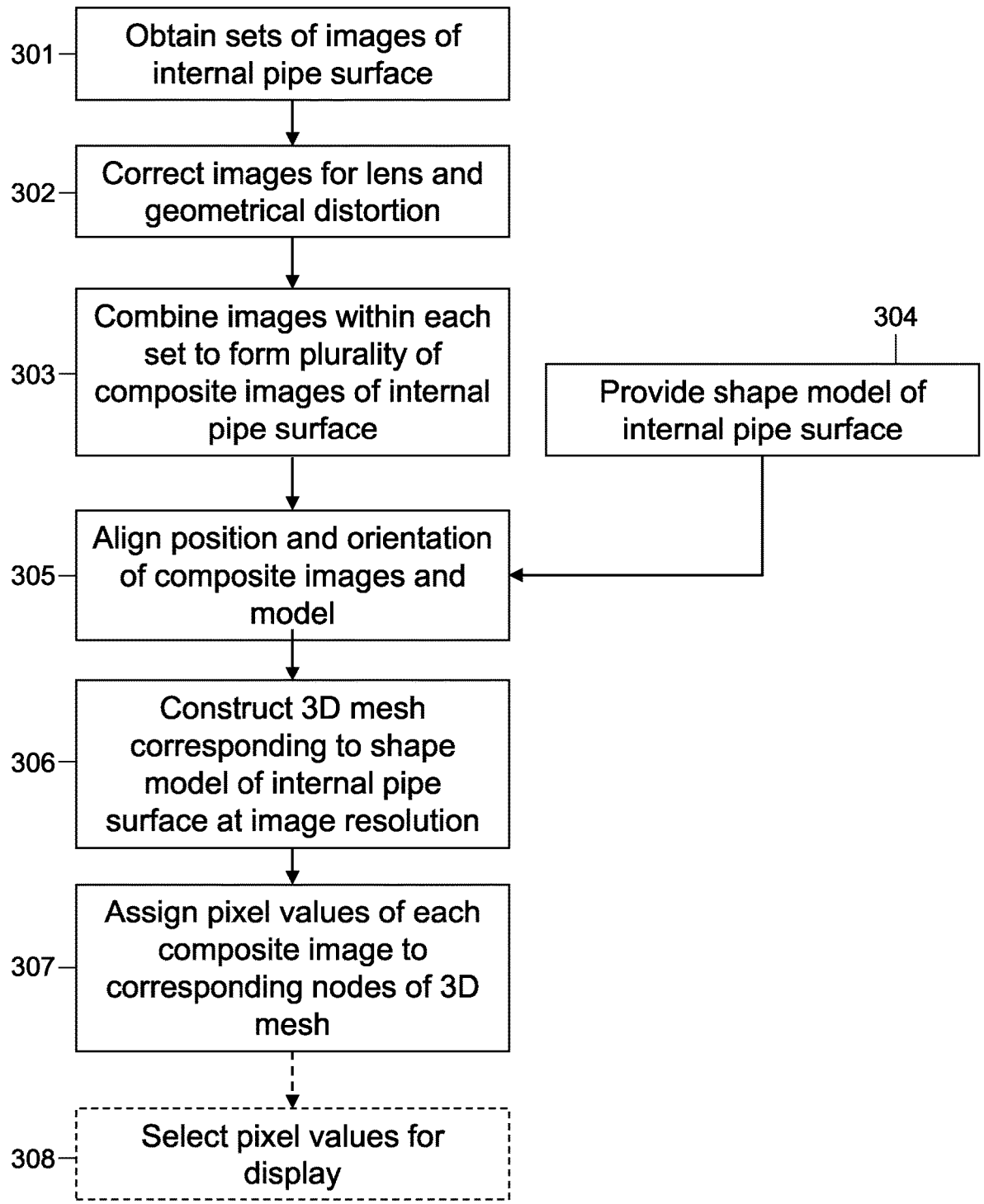
FIG. 6 is a flowchart showing steps in a second method for constructing a three-dimensional representation of the internal surface of the pipe.

FIG. 6 shows steps in another method according to an embodiment of the invention, in which the three-dimensional representation created by the method incorporates multiple sets of image data based on a plurality of composite images obtained using different acquisition conditions, such as camera angle, lighting conditions, spectral sensitivity, and so on.

In step 301, two or more sets of images of the internal pipe surface are obtained. The sets of images differ from one another in that at least one acquisition condition used when obtaining the images is different for each set of images. Each set of images covers a common region of interest of the internal pipe surface, so that each point in the region of interest is represented in at least one image in each set of images.

In step 302, the images obtained in step 301 are corrected to account for geometrical distortions caused by viewing geometry and other distortions and effects, and to apply a lens correction to account for individual lens properties.

In step 303, the corrected images in each set are combined to form a corresponding composite image of the internal surface using suitable image stitching techniques. In this way, two or more composite images are obtained of a region of interest of the internal surface of the pipe. The composite images differ from one another as a result of the different acquisition conditions used to obtain the respective sets of images from which they are derived.

In step 304, a shape model of the inside surface of the pipe is provided as explained above.

In step 305, the position and orientation of each composite image and the position and orientation of the shape model are aligned to allow the image data to be matched to the correct spatial position in the shape model.

In step 306, a three-dimensional mesh is constructed. The mesh corresponds to the shape model provided in step 304, with suitable interpolation so that the density of nodes in the mesh matches the resolution of the composite image.

In step 307, each node in the mesh is assigned a plurality of pixel values comprising one pixel value from each corresponding spatial position in each of the composite images.

The three-dimensional representation therefore includes multiple sets of image data, which can be useful for more detailed interpretation and analysis. When the three-dimensional representation is viewed, the sets of image data may be displayed together or separately.

For example, in optional step 308, a selection may be made during viewing of the three-dimensional representation to display pixel values originating from only one or a subset of the composite images. Such a selection may be made for the whole area being viewed of for different parts of the area being viewed. The selection may be made manually by a user, or may be made automatically by the viewing software according to viewing parameters such as apparent viewing angle.

Figure 7A:
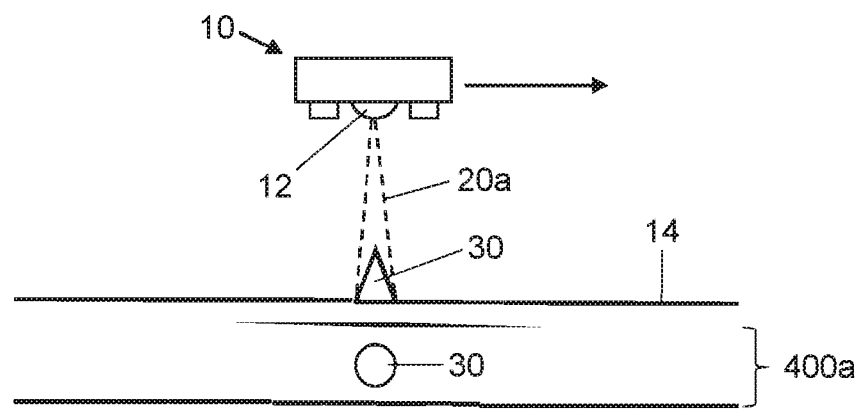
FIGS. 7a, 7b and 7c illustrate an inspection tool having a sideview camera capturing images of a feature on the internal surface of a pipe from three different camera angles.
Figure 7B:
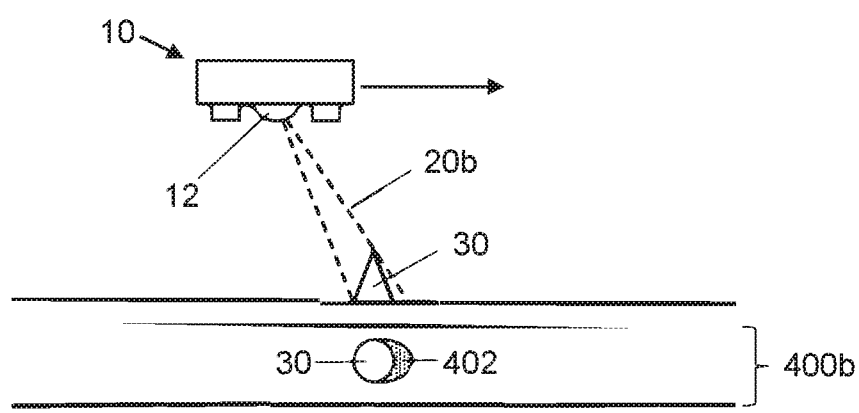
Figure 7C:
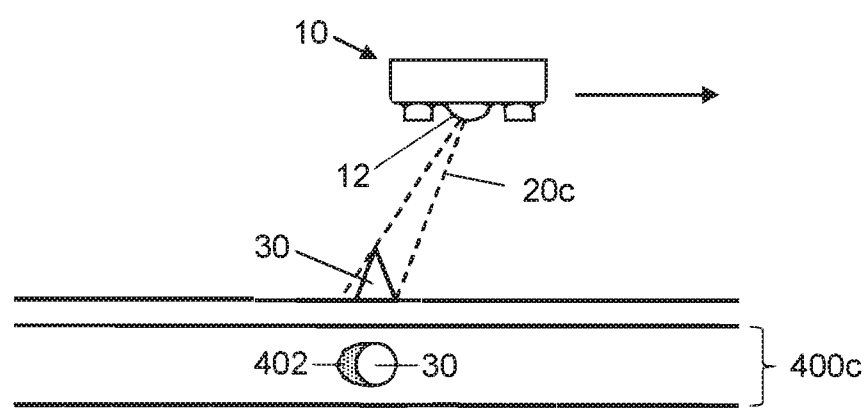

One image acquisition condition that can be varied when obtaining the different sets of images is the camera angle. By way of illustration, FIGS. 7a, 7b and 7c show an inspection tool 10 having a sideview camera 12 obtaining images of an inwardly-projecting feature 30 disposed on the inside surface of the pipe 14 using three different camera angles. In each Figure, a schematic representation of the resulting composite image 400a, 400b, 400c formed by stitching each set of images is provided, with all of the images in each set of images being obtained with the same camera angle.

In FIG. 7a, the field of view 20a of the camera 12 from which the images are obtained is oriented perpendicularly with respect to the axis of the tool 10 to give a camera angle of 90 degrees. In other words, in this case, the field of view 20a extends directly sideways from the tool 10. In the resulting composite image 400a, the feature 30 appears without a shadow.

In FIG. 7b, the field of view 20b is angled towards the direction of movement of the tool 10, so that the camera 12 "looks ahead" along the pipe 14 as the images are acquired. As a result of this imaging geometry, a shadow 402 appears in the resulting composite image 400b on one side of the feature 30 (on the side corresponding to the direction of movement of the tool).

In FIG. 7c, the field of view 20c is angled away from the direction of movement of the tool 10, so that the camera 12 "looks behind" along the pipe 14 as the images are acquired. In this case, the shadow 402 appears in the resulting composite image 400c on the opposite side of the feature 30 (on the side opposite to the direction of movement of the tool). The appearance of the feature 30 itself will also vary according to the image acquisition geometry, although this variation is not illustrated in FIGS. 7a, 7b and 7c.

A 3D representation can be constructed according to the method of FIG. 6 using three sets of images, corresponding to the three different camera angles illustrated in FIGS. 7a, 7b and 7c. When viewing the representation, the pixel data from a selected one of the sets of images can be displayed. The selection may be made by the user and/or automatically. In one example of automatic selection, the pixel data selected for display in a given region of the 3D representation is from the set of images acquired with the camera angle that most closely matches the current viewing angle of that region in the 3D representation.

In practice, sets of images obtained with different camera angles, as illustrated in FIGS. 7a, 7b and 7c, can be produced by capturing video frames with a wide field of view, and cropping a section of each frame at a suitable axial offset from the centre of the frame so that the cropped image lies at the desired camera angle. In this way, multiple sets of images at different camera angles can be obtained from a single video sequence.

Another acquisition condition that can be varied to obtain different sets of images is the lighting angle. By way of illustration, FIGS. 8a and 8b each show an inspection tool in two positions during movement of the tool 10 along a pipe 14. The tool 10 has a sideview camera 12 and first and second light sources 32a, 32b disposed on either side of the camera 12. The internal wall of the pipe 14 has a projecting feature 34 and a step 36.

Figure 8A:
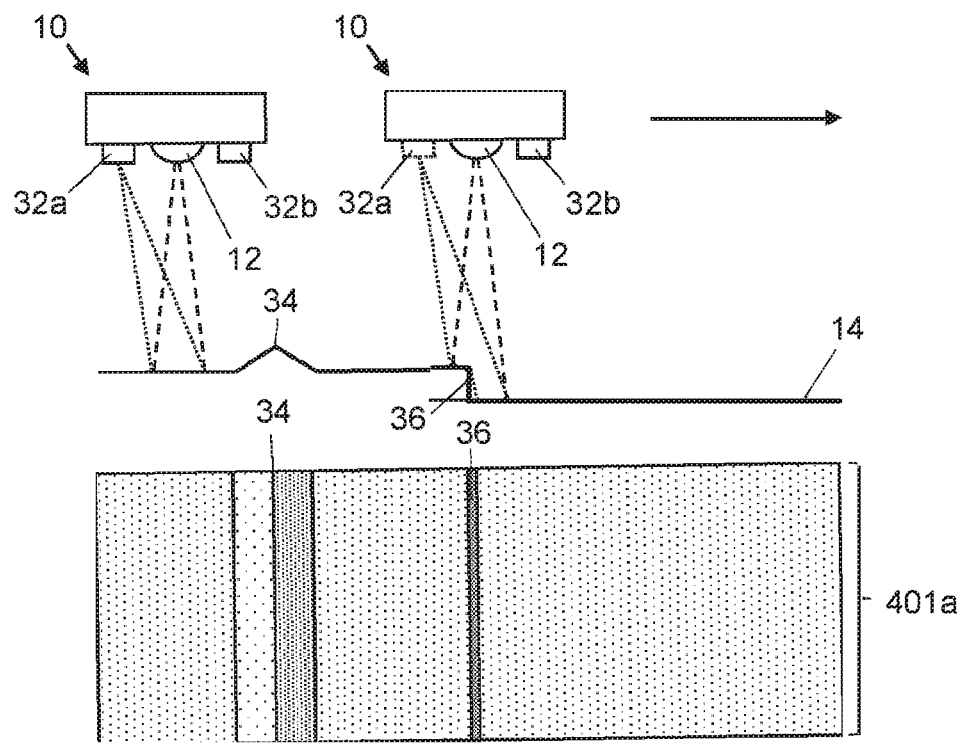
FIGS. 8a and 8b illustrate an inspection tool having a sideview camera capturing successive images of the internal surface of a pipe as the inspection tool is moved along the pipe, using first and second lighting angles respectively.
Figure 8B:
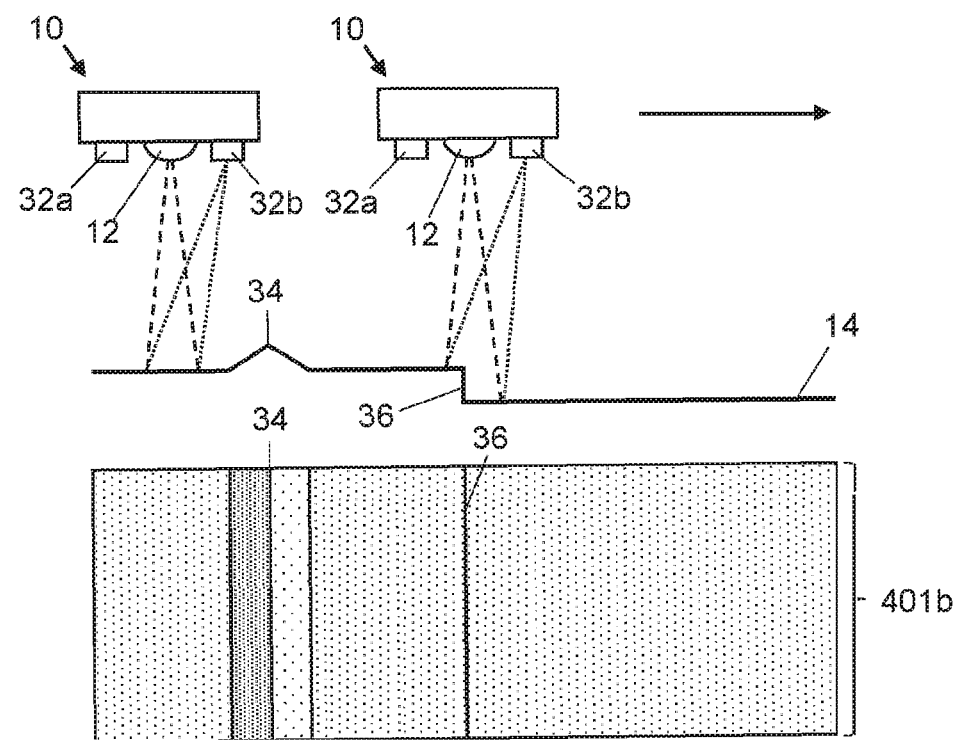

In FIG. 8a, the first light source 32a is illuminated during acquisition of the images, while in FIG. 8b the second light source 32b is illuminated, so that the lighting angle differs between the two sets of images.

Schematic representations of the resulting composite images 401a, 401b formed by stitching each set of images are shown in FIGS. 8a and 8b, with all of the images in each set of images being obtained with the same lighting angle. The camera angle is the same for both sets of images.

In this simplified example, the composite images 401a, 401b obtained using different lighting angles differ in contrast in the regions of the projection 34 and the step 36, so that the two composite images 401a, 401b together provide more information to a user than would be available from a single image.

A 3D representation can be constructed according to the method of FIG. 6 using two sets of images, corresponding to the two different lighting angles illustrated in FIGS. 8a and 8b. As before, when viewing the representation, the pixel data from a selected one of the sets of images can be displayed. The selection may be made by the user, and/or automatically.

Further examples of acquisition conditions that can be varied to obtain different sets of images for use in the method of FIG. 6 include lighting colour and/or intensity. For example, certain features of a pipe or conduit, such as corrosion, may be more readily visible when illuminated under specific lighting colours.

In another example, the different sets of images differ in the spectral range captured during image acquisition. This can be varied by suitable selection of the spectral sensitivity of the camera sensor and/or the properties of lighting used to illuminate the field of view. For instance, the different sets of images may provide data from different regions of the visible light spectrum (with particular colours being filtered out or in), and/or from non-visible parts of the spectrum (such as infra-red or ultra-violet).

In cases in which multiple sets of images with different acquisition properties are obtained, it is preferable if all of the sets of images are obtained using one or more cameras or sets of cameras mounted on the same inspection tool. In this way, all of the image data can be acquired during the same transit of the tool and the positions and orientations of the sets of images can be readily matched. It is possible, however, that the sets of images could be obtained during multiple runs of the same tool or of different tools through the region of interest, in which case additional position and orientation matching steps will be required.

Figure 9:
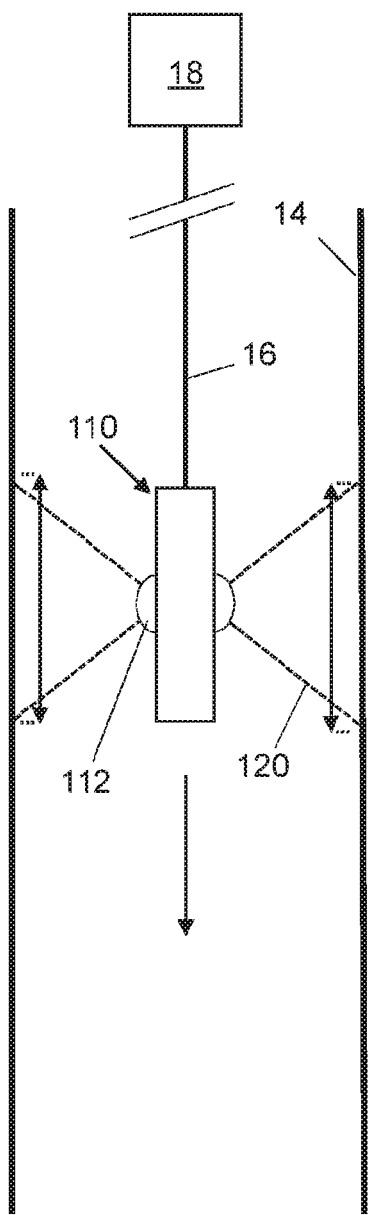
FIG. 9 illustrates an inspection tool having multiple sideview cameras capturing an image of the internal surface of a pipe.

The images obtained in step 101 of the method of FIG. 2 and in step 301 of the method of FIG. 6 can be obtained with any suitable inspection tool. For example, FIG. 9 shows a variant of the tool 10 described above with reference to FIG. 1. The tool 110 of FIG. 9 comprises a plurality of side view cameras 112 such that there are a plurality of corresponding camera lenses spaced equidistantly around the circumference of the inspection tool 110. A centreline of the field of view 120 of each of the cameras 112 is substantially perpendicular to a longitudinal axis of the inspection tool 110.

Figure 10:
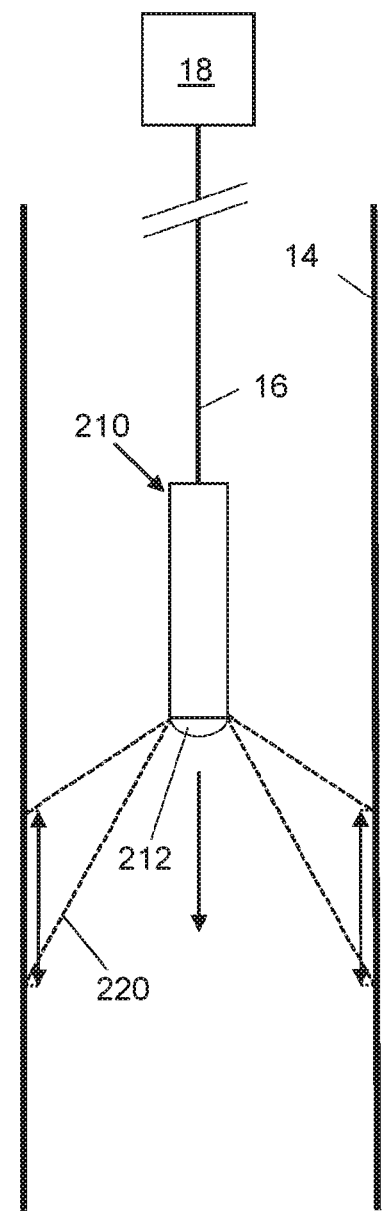
FIG. 10 illustrates an inspection tool having a downview camera capturing an image of the internal surface of a pipe.

FIG. 10 shows another suitable inspection tool 210. In this case, the camera 212 is a downwards facing camera such that the camera captures images through a lens disposed at a distal end of the tool. In this case a centreline of the field of view 220 of the camera is preferably coaxial with a longitudinal axis of the inspection tool 210. The camera is generally referred to as a downview camera in the art of wellbore inspection tools.

The geometrical corrections applied to the images in step 102 of the method of FIG. 2 and in step 302 of the method of FIG. 6 take into account the geometry of the inspection tool 10, 110, 210 and in particular the position of the cameras 12, 112, 212 of the tool 10, 110, 210. The viewing position of the or each camera lens is restricted because the lenses must be disposed on the surface of the logging tool. The position of the tool in the pipe may vary considerably from an ideal central location. Commonly, the tool is not centrally positioned within the pipe when the images are captured. Also, the axis of the tool may not be parallel to the axis of the pipe or conduit. This leads to points on the pipe surface being observed from a variety of distances and angles.

A given point on the pipe surface might therefore be viewed from a variety of distances and angles in several different images under different lighting conditions. It is, therefore, necessary to apply a geometrical correction to each image to allow the images to be combined in an optimum way in the 3D representation to permit accurate interpretation. In particular, to most accurately interpret the camera data, each image pixel must be positioned correctly in a 3D space at its reflection point. Any distortions due to viewing geometry must, therefore, be removed.

When the inspection tool includes multiple sideview cameras, as in the example of FIG. 9, suitable geometrical corrections may be determined by measuring overlap between a series of images captured by a set of cameras 112 spaced around the circumference of the inspection tool 110. The cameras 112 are, preferably, disposed in a single plane that extends perpendicular to a longitudinal axis of the inspection tool 110. Accordingly, each of the cameras 112 is disposed at the same distance from an end of the inspection tool 110.

The multiple (e.g. 4) cameras 112 are mounted symmetrically or equidistantly around the inspection tool and are arranged such that, within a certain range of pipe sizes, there is an overlap in the fields of view 120 of neighbouring cameras 112. There is, therefore, a corresponding overlap in the captured images from neighbouring cameras 112.

When the inspection tool 110 is centred in a pipe or conduit 14 having a known internal diameter, the amount of overlap between each of the neighbouring captured images will be the same and will be known. If, however, the tool 110 is not centred in the pipe or conduit 14, the amount of overlap between each of the neighbouring captured images will not be equal. The amount of overlap between neighbouring captured images is preferably measured by finding the overlap position between adjacent images with the maximum cross-correlation of image intensity. Alternatively, other image recognition techniques may be used to automatically detect one or more features common to the two neighbouring images to determine the extent of overlap. The differences in the overlap between neighbouring images are then used to determine the distance and direction of the inspection tool 110 from the centre of the pipe or conduit 14 having a known internal diameter. From this information, appropriate geometrical corrections can be applied to the images.

When the inspection tool includes one or more sideview cameras, as in the examples of FIGS. 1 and 9, another method of determining the geometrical corrections is to compare successive images or frames from a video stream captured by a sideview camera 12, 112. The frame rate of the video is greater than the speed of travel of the inspection tool 10, 110 along the pipe such that successive images overlap in the axial direction. Near the centre of the images the shift between successive images, i.e. the distance a feature has travelled between successive images, will be equal to the speed of the inspection tool 10, 110 multiplied by the time between images (derived from the video frame rate). Due to imaging geometry, however, the shift observed between successive images of a feature at a distance from the centre of the images, in a direction parallel to a longitudinal axis of the pipe 14, depends on the distance of the lens from the pipe wall.

Accordingly, a further step in this method comprises measuring the variation in shift between successive images with distance from the centre of the images. When the tool 110 includes multiple cameras 112, the variation in shift can be calculated for each of the streams of successive images captured by each of the cameras 112 around the circumference of the inspection tool 110. The variation in shift is then compared to calculate the distance and direction of the inspection tool 10, 110 from the centre of the pipe or conduit 14 having a known internal diameter. Again, from this information, appropriate geometrical corrections can be applied to the images.

In embodiments in which the camera 212 is located at the end of the inspection tool 210 (downview camera), as in the example of FIG. 10, the geometrical corrections may be determined by automatically detecting one or more features common to all of the images in a sequence of successive images. This common feature or fixed feature may, for example, be the vanishing point. The fixed features are detected by means of suitable image recognition techniques, such as by detecting the characteristic shape and contrast of the far pipe (the vanishing point). One or more moving features are also detected in the sequence of successive images. These are features that are stationary in the pipe or conduit 14 such that the position of these features in successive images captured by the camera 212 moves according to the location of the camera 212 in the pipe 14. Parts or regions of each of the images having high contrast are automatically detected and their positions are recorded.

The change in the spatial positions of the detected moving objects between successive images in the sequence of images is tracked, so that a trajectory for each of the detected moving objects can be calculated. In a subsequent step, the position of one or more fixed features and the trajectory of one or more moving features are used to determine the position of the lens of the camera 212 in the pipe 14 and the orientation or angular tilt of the axis of the inspection tool 210 relative to the pipe axis. This camera position information, including distance of the camera lens from a central axis of the pipe and angular tilt of the tool relative to the axis of the pipe, is then used to calculate a geometrical correction factor that is applied to each pixel of the images.

The corrections applied to the images in step 102 of the method of FIG. 2 and in step 302 of the method of FIG. 6 may also account for lens distortions. To this end, a calibration process may be performed to establish the relationship between pixel (X, Y) position on the corrected image and the incoming light ray elevation and azimuth for the or each camera lens used during image acquisition. This calibration can be completed by photographing a known target through a medium (i.e. an appropriate gas or liquid) with the same refractive index as present in the borehole or pipe 14 and establishing the correction required to account for lens distortions. The appropriate correction can then be applied to the images.

Alignment of the position and orientation of the composite image and the position and orientation of the shape model, in step 105 of the method of FIG. 2 or step 305 of the method of FIG. 6, can be achieved in any suitable way. In general, it may be necessary to apply axial and angular offsets to the corrected image data in the or each composite image to align the pixels with the correct spatial positions in the shape model.

If the shape model is based on radius measurements obtained from a measuring device, such as a multi-finger caliper device, mounted on the same tool or toolstring as the camera or cameras, then the radius data and the image data can be obtained in the same logging run. In such cases, the relative orientation of the shape model and the image data and the axial offset between the shape model and the image data are readily determined from the known geometry and dimensions of the tool or toolstring.

If the shape model is based on radius measurements obtained in a different logging run to the image data, then the axial offset between the radius data and the image data can be estimated by determining the axial position or depth of the respective tool during acquisition of the data and aligning each set of data according to the determined axial position. The depth of the tools may for example be determined from an uphole measurement of the cable displacement during the logging run and/or by analysing the data to identify certain features of the pipe, such as collars, whose position is known. The angular offset can be determined by using orientation sensors in each tool.

Refinement or fine-tuning of the axial offset and angular offset may be performed manually or by an automatic process, for example by aligning the positions of distinctive features that can be readily identified in both the radius data and the image data, such as collars, steps, intersections, holes, and so on.

In some cases, an axial offset and/or an angular offset may not be necessary. For example, if the shape model is cylindrically symmetrical, then no angular offset is required. If the shape model is uniform in the axial direction, then no axial offset is required. In the case where the shape model is a simple cylinder, as illustrated in FIG. 5, then neither axial nor angular alignment is necessary.

The devices and/or components described herein can perform one or more processes and/or methods described herein. For example, the devices and/or components can perform at least a portion of such processes and/or methods based on a processor executing software instructions stored by a computer-readable medium, such as memory and/or storage component. A computer-readable medium (e.g., a non-transitory computer-readable medium) is defined herein as a non-transitory memory device. A memory device includes memory space located inside of a single physical storage device or memory space spread across multiple physical storage devices. When executed, software instructions stored in a computer-readable medium may cause a processor to perform one or more processes and/or methods described herein. Additionally, or alternatively, hardwired circuitry may be used in place of or in combination with software instructions to perform one or more processes and/or methods described herein. Thus, embodiments described herein are not limited to any specific combination of hardware circuitry and software.

Further modifications and variations of the invention not explicitly discussed above are also possible without departing from the scope of the invention as defined in the appended claims.

The invention claimed is:

1. A method for constructing a three-dimensional representation of an internal surface of a conduit, comprising:
   obtaining at least a first set and a second set of images of the internal surface of the conduit, each set of images being of a common area of the internal surface, the first set of images being obtained using first image acquisition conditions and the second set of images being obtained using second image acquisition conditions that differ from the first image acquisition conditions;
   constructing, from each set of images, a respective composite image of the common area of the internal surface;
   providing a shape model of the internal surface;
   constructing, using the shape model, a three-dimensional mesh of the internal surface; and
   constructing a three-dimensional representation of the internal surface by assigning a pixel value from each composite image to a corresponding node of the mesh.

2. The method according to claim 1, further comprising aligning the position and/or orientation of each composite image and the shape model.

3. The method according to claim 1, wherein the mesh is constructed such that a node density of the mesh equals a pixel resolution of the composite images.

4. The method according to claim 1, wherein providing the shape model of the internal surface comprises obtaining a plurality of radius measurements of the internal surface of the conduit.

5. The method according to claim 4, comprising obtaining the plurality of radius measurements when obtaining the sets of images.

6. The method according to claim 1, comprising correcting each set of images for lens and/or geometrical distortions.

7. The method according to claim 1, comprising selecting, for each node, a pixel value from one of the respective composite images for display in the three-dimensional representation.

8. The method according to claim 7, comprising selecting the pixel value from one of the respective composite images automatically according to a viewing condition of the three-dimensional representation.

9. The method according to claim 1, wherein the first and second sets of images are obtained using different respective camera angles.

10. The method according to claim 1, wherein the first and second sets of images are obtained using different respective lighting conditions.

11. The method according to claim 1, wherein the first and second sets of images are obtained using different respective spectral sensitivities.

12. A method for constructing a three-dimensional representation of an internal surface of a conduit, comprising:
    obtaining at least two sets of images of a common area of the internal surface, each set of images being obtained under different respective image acquisition conditions;
    constructing, from each set of images, a respective composite image of the common area;
    providing a shape model of the internal surface;
    constructing, using the shape model, a three-dimensional mesh of the internal surface;
    constructing a three-dimensional representation of the internal surface by assigning a pixel value from each composite image to a corresponding node of the mesh; and
    selecting, for each node, a pixel value from one of the composite images for display in the three-dimensional representation.

* * * * *